United States Patent [19]

Herrington et al.

[11] Patent Number: 4,703,591
[45] Date of Patent: Nov. 3, 1987

[54] ULTRA-HIGH PRESSURE ABRASIVE JET CUTTING OF GLASS

[75] Inventors: Richard A. Herrington, Walbridge; Thomas G. Kleman, Graytown; Ermelinda A. Apolinar, Toledo, all of Ohio

[73] Assignee: Libbey-Owens-Ford Co., Toledo, Ohio

[21] Appl. No.: 747,937

[22] Filed: Jun. 24, 1985

Related U.S. Application Data

[63] Continuation-in-part of Ser. No. 723,578, Apr. 15, 1985, and a continuation-in-part of Ser. No. 654,975, Sep. 27, 1984, Pat. No. 4,656,791.

[51] Int. Cl.$^4$ ............................................. B24C 1/00
[52] U.S. Cl. .................................... 51/321; 51/410
[58] Field of Search ................ 51/410, 319, 320, 321, 51/326, 415; 83/53; 239/1, 77; 148/9

[56] References Cited

U.S. PATENT DOCUMENTS

| | | | |
|---|---|---|---|
| 2,442,013 | 5/1948 | Mott et al. | 148/9 |
| 2,985,050 | 5/1961 | Schwacha | 51/410 |
| 3,212,378 | 10/1965 | Rice | 51/321 |
| 3,532,014 | 10/1970 | Franz | 83/177 |
| 3,888,054 | 6/1975 | Maselli | 51/319 |
| 4,272,017 | 6/1981 | Franz | 83/53 |
| 4,380,138 | 4/1983 | Hofer | 51/321 |
| 4,525,958 | 7/1985 | Reissig | 51/283 E |

OTHER PUBLICATIONS

"Abrasive Jet Machining" Tool and Manufacturing Engineer, Nov. 1967, Ingulli.

Primary Examiner—Frederick R. Schmidt
Assistant Examiner—Robert A. Rose
Attorney, Agent, or Firm—Marshall & Melhorn

[57] ABSTRACT

A system adapted to readily cut intricate interior patterns from, as well as make simple cuts across, glass blanks of various thicknesses at increased speed by means of an ultra-high pressure abrasive fluid jet. A highly collimated fluid stream or jet, into which abrasive particles are aspirated, is directed against the glass from a pressurized source. For initial penetration of the glass within the interior of the blank, the pressurized source is maintained at a first pressure level, so that the glass is initially penetrated without fracturing or undue chipping at the point of penetration and whereby the abrasive fluid stream may be advanced along the desired path relative to the glass at a first speed such as to sever the glass. After initial penetration by the abrasive jet the pressure level of the pressurized source of fluid is significantly increased, enabling the line speed of the fluid jet relative to the glass to be likewise significantly increased while still severing the glass and producing cut edges of high quality.

23 Claims, 4 Drawing Figures

ULTRA-HIGH PRESSURE ABRASIVE JET CUTTING OF GLASS

CROSS REFERENCE TO RELATED APPLICATIONS

The present application is a continuation-in-part application of copending application Ser. No. 723,578, filed Apr. 15, 1985, pending, and application Ser. No. 654,975, filed Sept. 27, 1984, now U.S. Pat. No. 4,656,791.

BACKGROUND OF THE INVENTION

1. Field of the Invention

The present invention pertains generally to the cutting of glass by means of an abrasive fluid jet and more particularly to the cutting of glass along any desired line of cut, including intricate patterns, at relatively high speed with resultant high quality cut surfaces by means of an abrasive fluid jet directed against the glass.

2. Description of the Prior Art

Because of its extreme hardness and frangible nature, unique problems are presented in the cutting or severing of glass. Conventional glass cutting actually involves a controlled breaking or fracturing of the glass. Thus, the surface of the glass is scored by a relatively harder instrument along the desired path of fracture, and the glass is then flexed along the score line to cause it to fracture and separate along this line. While such a procedure is satisfactory for certain purposes, it also has many limitations. A glass sheet is very rigid and it must be flexed along the score line to cause the final fracture. As will be apparent, while the sheet can be readily flexed along a straight score line, extending substantially across the sheet, flexing is much more difficult along score lines of an interior cutout and becomes nearly impossible for such openings of small dimensions. Flexing along a curved score line may be troublesome, and it becomes increasingly difficult as the degree of curvature increases. Flexing along lines with short radii of curvature is virtually impossible so that intricate patterns can be cut only with great difficulty, if at all. Likewise, formation of small mounting openings as commonly required in present day automobile sidelites is not feasible by this method, so that such openings must generally be formed by means of a diamond drill.

The procedure is effective in cutting relatively thin glass wherein, because of the depth of the score mark relative to the total glass thickness, the fracture will follow the score line. However, in cutting thicker glass by this method the line of fracture may not follow the score line so that a ragged edge is formed, or the glass may actually fracture along a random line, destroying the glass sheet. The difficulty of cutting increases as the thickness increases, so that cutting very heavy glass is time consuming and expensive, and the yield of useable glass is relatively low. The method also tends to leave a sharp edge at the surface opposite the score line, which is objectionable in additional fabricating steps.

Other systems such as so-called hot line cutting, wherein the glass is heated along a line and then chilled to cause fracturing along the line, and cutting with a diamond saw, have been suggested for cutting glass and particularly thick glass. However neither has proven entirely satisfactory in a commercial operation, and particularly for production of other than straight line cuts. Such methods tend to be slow and expensive and may create undesirable stresses in the glass. They also are not readily adapted to cutting complex shapes in glass.

The concept of liquid jet cutting of various materials is known in the prior art, as is the use of abrasive particles in conjunction with the liquid jet. While it is suggested, for example, by U.S. Pat. No. 3,888,054, that hard or brittle materials such as glass may be cut by a stream of abrasive particles carried in a fluid, it is also disclosed that the workpiece should be immersed in a liquid to avoid abrading away of the surface adjacent the cut. U.S. Pat. No. 4,380,138 discloses abrasive liquid jet cutting wherein abrasive particles are positioned adjacent the surface of the material to be cut and then driven into the workpiece by the liquid jet, and suggests that it was previously unknown to add abrasive particles directly to high velocity liquid cutting jets. In any event, the prior art is not believed to appreciate the cutting of glass with an abrasive fluid jet in the manner and at the pressure contemplated by the present invention.

Thus, it has been found that when flat glass sheets of thicknesses in general commercial use are initially impacted interiorly of their periphery by an abrasive fluid jet pressurized to a level materially exceeding 10,000 psi, as in forming holes or interior cut-outs in the glass, chipping, severe venting or shattering of the glass at the point of impact is likely to occur. The vents and chipped edges may extend into the adjacent glass part, rendering it unuseable for its intended purpose. Consequently, it has heretofore generally been considered necessary for such cutting on a large scale to be done with a fluid under a pressure on the order of 10,000 psi or less in order to prevent damage to or destruction of the glass. The line or cutting speed is a function of the degree of pressurization of the abrasive fluid, and at this pressure the cutting speed is so limited as to make the procedure marginally useful for commercial purposes.

SUMMARY OF THE INVENTION

It has now been determined that cutting may advantageously be accomplished with the abrasive fluid jet pressurized to a much higher level, with a consequent increase in line or cutting speed, while still achieving cut edges of acceptable quality equivalent to those previously achieved at the lower pressures. More particularly, abrading away of the glass along the line of cut by the advancing jet ideally occurs with the abrasive fluid jet pressurized to a level on the order of 20,000 psi to 35,000 psi, and preferably about 30,000 psi, whereby cut edges of acceptable quality can be produced at greatly increased line speeds for all thicknesses of glass. Pressures materially above 35,000 psi, however, may result in cut edges of reduced quality regardless of line speed.

Thus, in accordance with the present invention, annealed glass of various thicknesses may be cut along any desired path, from straight lines to intricate shapes, relatively quickly and inexpensively with a resulting edge finish of high quality. To that end, the glass is firmly supported along the path which the cut is to follow, and a high velocity fluid jet, into which a fine abrasive material is aspirated in carefully controlled amounts, is directed against the glass surface in a highly collimated stream. Where the cut is to begin at an edge of a glass sheet that is, initial contact with the glass begins at an exposed edge, the abrasive fluid jet is discharged under the normal high operating pressure and moved toward and into engagement with the glass to begin cutting at the free edge with a line speed at which cut edges of acceptable quality are produced. On the other hand, where initial penetration is to be in the interior of the sheet, the fluid is discharged under a reduced entry level pressure during initial penetration of the glass so as to begin the cut without undue spalling or complete shattering of the glass at the point of entry, and the pressure is then increased to the substantially higher level as the cut proceeds in order to achieve maximum cutting or line speed, with the resulting cut edges having the desired high quality. It will be understood, of course, that while the invention has been illustrated and described herein as creating relative movement between the fluid jet and glass by moving a nozzle assembly relative to a stationary glass sheet, it is fully contemplated the relative movement may likewise be created by moving the glass relative to a fixed nozzle assembly or by combined movements of the two.

It is, therefore, a primary object of the invention to cut glass by means of an abrasive fluid jet.

Another object of the invention is to provide a process for so cutting glass in which abrasive particles are aspirated into the fluid jet or stream prior to its discharge toward the glass.

Another object of the invention is to provide such a process wherein the abrasive fluid jet impinges directly against the exposed surface of the glass.

Another object of the invention is to provide a process for accurately and precisely cutting any desired pattern, from simple to complex, from a glass blank.

Still another object is to maximize the line speed in cutting glass by means of an abrasive fluid jet.

Other objects and advantages will become apparent during the course of the following description when taken in connection with the accompanying drawing.

BRIEF DESCRIPTION OF THE DRAWINGS

In the drawings, wherein like numerals refer to like parts throughout.

DESCRIPTION OF THE PREFERRED EMBODIMENTS

Figure 1:
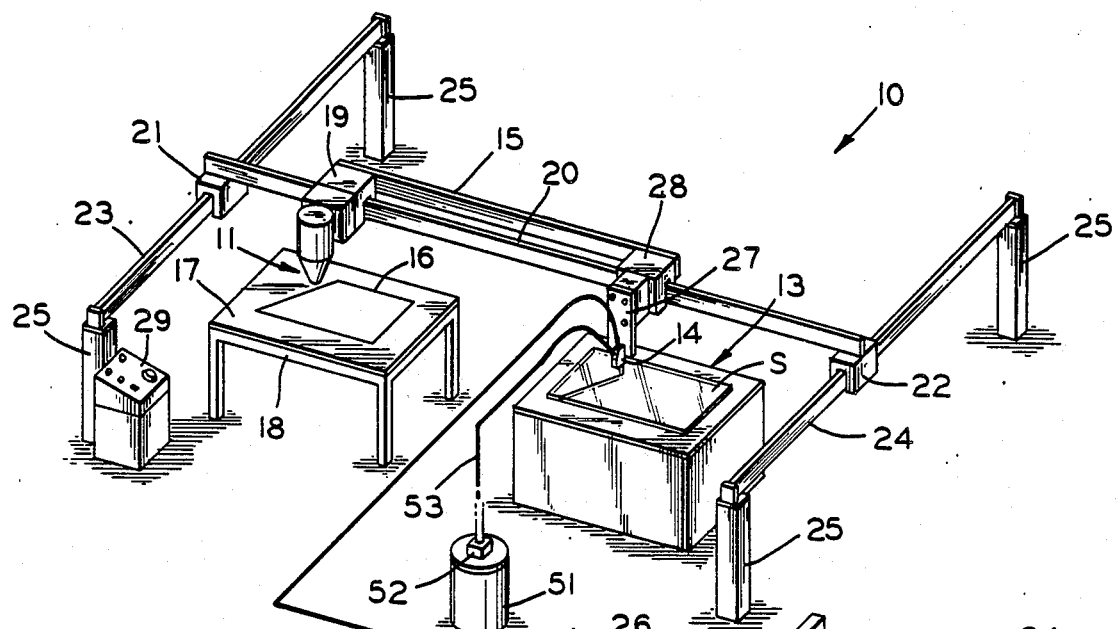
FIG. 1 is a schematic perspective view of a system for practicing the invention.

Referring now to the drawings, there is illustrated schematically at 10 in FIG. 1 a system which may be employed in cutting glass sheets in accordance with the invention. More particularly, the system is adapted for cutting glass sheets or blanks along prescribed lines of any preferred configuration and includes an optical tracer apparatus 11 and an abrasive fluid jet cutting apparatus, generally designated 12. The cutting apparatus 12 includes a support stand 13 adapted to firmly support a glass sheet S, as on a sacrificial support plate, for cutting as will be hereinafter more fully described. While the illustrated system represents a preferred embodiment for practicing the invention, as will be readily appreciated the invention is not limited to use with such a system but also has utility with other and different equipment.

In the illustrated embodiment the fluid jet cutting apparatus 12 includes a discharge or nozzle assembly 14, as will be hereinafter more fully described, mechanically connected to the optical tracer 11 by means of a tie bar 15. The tracer is provided for guiding the movement of the nozzle assembly 14 in accordance with a template or pattern 16 on a plate member 17 mounted on a table 18. The optical tracer 11 is affixed to a carriage 19 slidably mounted on an elongated transverse track 20 which is provided at its opposite ends with a pair of carriages 21 and 22. The carriages 21 and 22 are slidably mounted on parallel tracks 23 and 24, respectively, supported by stanchion members 25 on a floor 26. The nozzle assembly 14 is affixed as by a plate 27, to a carriage 28 also slidably mounted on the transverse track 20. The carriage 28 is rigidly connected in spaced relationship to the carriage 19 by the tie bar 15, with the spacing between the carriages 19 and 28 being such that the optical tracer 11 and the nozzle assembly 14 overlie the plate 17 and the support stand 13, respectively.

Thus, as will be readily appreciated, with the above described carriage system the tracer 11 is capable of movement in any direction longitudinally, laterally or diagonally, with the carriage 28 and nozzle assembly 14 following the same motion due to the union of the carriages 19 and 28 by the tie bar 15 and the track 20. In operation, as the tracer 11 follows the outline or pattern 16, the fluid jet cutting nozzle 14, via the carriage 28, is caused to move correspondingly over the support stand 13 and the glass sheet S thereon. For purposes of illustration the path of the cut along the sheet S has been illustrated as beginning at an edge and running diagonally across the sheet. It will be understood, of course that inasmuch as the path is dictated by the template or pattern 16, it may as well prescribe a closed interior cut-out or circular opening if so dictated by the template. Control of the tracer functions such as power on/off, speed, automatic and manual operation, level of pressurization of the fluid jet, etc., may be effected as from a conveniently located control panel 29.

The fluid jet cutting apparatus itself as shown schematically in FIG. 1, includes an electric motor 30 driving a hydraulic pump 31, which in turn supplies working fluid through a conduit 32 to a high pressure intensifier unit 33. The function of the intensifier unit 33 is to draw in fluid (for example, deionized water) from a suitable source, such as a reservoir 34, and place it under a very high pressure which may be variably controlled, preferably on the order of 10,000 to 30,000 psi., for discharge through a conduit 35. Mounted at the discharge end of the conduit 35 is nozzle assembly 14 for directing a very high velocity, small diameter fluid jet toward the glass sheet S upon the support stand 13.

Figure 2:
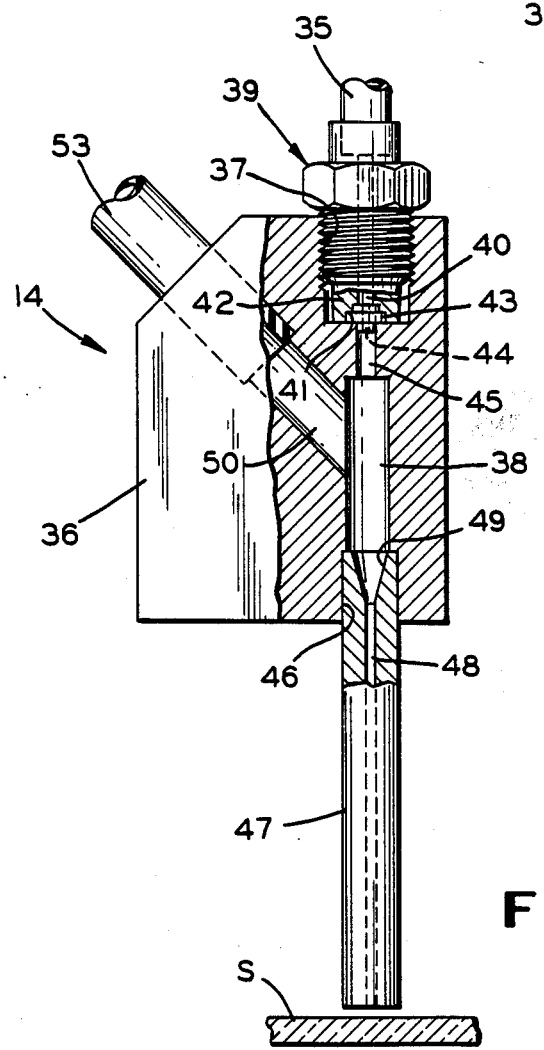
FIG. 2 is an enlarged side elevational view, partly in section, of a jet nozzle assembly employed in cutting glass by means of an abrasive fluid jet.

As best shown in FIG. 2, the nozzle assembly 14 comprises a generally rectangular housing 36 having a threaded bore 37 at its upper end, axially aligned with a flow passageway 38 extending through the housing. An externally threaded connector 39, having a flow passageway 40 extending therethrough, is suitably attached to the discharge end of the conduit 35 for connecting the conduit to the housing. A recess 41 is provided in a boss 42 at the threaded end of the connector 39, within which is mounted a fluid jet orifice 43 having a discharge opening 44 of very small, for example, on the order of 0.004 to 0.018 inch (0.10 to 0.46 mm) and preferably about 0.014 inch (0.35 mm), diameter. When securely threaded in the bore 37, the connector 39 properly seats the orifice 43 in the upper, reduced diameter portion 45 of the flow passageway 38. The lower end of the passageway 38 includes an enlarged diameter portion 46 for receiving a nozzle or mixing tube 47. The nozzle tube includes a relatively small diameter, for example on the order of 0.040 to 0.062 inch (1.0 to 1.57 mm) and preferably about 0.062 inch (1.57 mm) longitudinal passageway 48 with an outwardly flared entrance opening 49 for more readily receiving the jet stream from the orifice 43.

Obliquely oriented to the passageway 38 is a bore 50 for delivering abrasive material, as will be hereinafter more fully described, into the path of the fluid jet stream. A regulated supply of the abrasive is carried from a storage container 51 and regulator 52 to the bore 50 by means of a flexible conduit or carrier tube 53. The abrasive material is aspirated into the fluid jet stream as the stream passes through the passageway 38, wherein it is mixed and accelerated into the high pressure stream prior to entering the passageway 48 in the nozzle tube 47. In operation, the exit end of the tube 47 is generally positioned relatively close to the surface of the workpieces, as will be more fully described, in order to minimize dispersion of the jet stream and thus provide a minimum kerf or impingement area width. It will be appreciated that the aforedescribed nozzle assembly is only intended to be representative of those which may be employed in practicing the invention.

In order to produce a cut edge of acceptable quality at a rapid rate by means of an abrasive fluid jet, it is imperative that a number of parameters in the process be properly correlated and controlled. Thus, it has been found that factors such as the type and particle or grit size of abrasive material, type of fluid medium and degree to which it is pressurized, feed rate of the abrasive material, diameter of the orifice discharge opening 44, length and diameter of the passageway 48 in the nozzle tube 47, distance of the nozzle from the glass surface, thickness of the glass, and rate of progression of the cutting jet along the glass, all interact and must be properly correlated in order to produce a cut of high quality at a suitable line speed.

Figure 3:
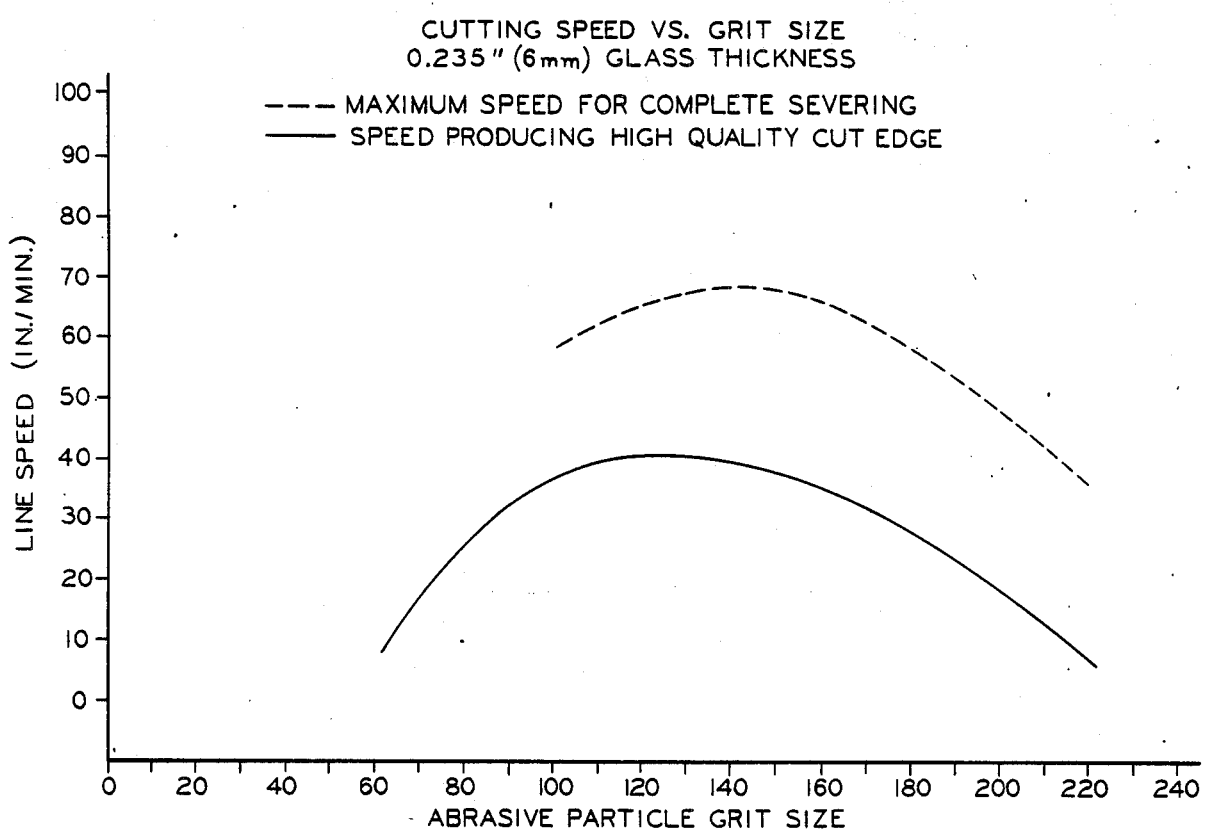
FIG. 3 is a graph illustrating the relationship between cutting or line speed and the grit size of the abrasive particles for a particular glass thickness.

A number of products are commercially available for use as the abrasive medium, including those sold under the names Biasil, AMA Zircon, Zircon M, Florida Zircon, Zircon 'T', Idaho Garnet, Barton Garnet, O-I Sand and Rock Quartz. The products are available in a range of nominal sizes extending from 60 grit or coarser to 220 grit or finer. It has been found that while glass can be successfully cut in accordance with the invention using abrasive particles having any of the aforementioned sizes by appropriately varying interrelated parameters such as line speed and fluid pressure, use of abrasive particles within a particular size range will produce a cut edge of high quality at faster line speeds than other grit sizes in glass of most commercially available thicknesses. Thus, in the graph of FIG. 3 there is plotted the experimentally determined relationship betwen abrasive particle grit size and line or cutting speed in cutting glass of 0.235 inch (6.0 mm) thickness at a fluid pressure of 30,000 psi in accordance with the invention. The upper, broken-line curve represents the maximum speed of the cutting head, i.e., line speed, at which the advancing abrasive jet will sustain a cut entirely through the glass. At such a speed the cut glass edges tend to chip and develop undesirable striations and vents running into the adjacent glass, so that the cut may not be of acceptable quality. The lower, solid-line curve represents the attainable speed at which the cut glass edges will be of a smooth, uniformly high quality. As will be apparent, maximum speed is attained while achieving both complete severance and quality edge condition with an abrasive particle grit size in the 130 to 150 range. The family of curves representing cutting speed vs. grit size for commercially manufactured glass thicknesses below 0.235 inch (6.0 mm) is generally similar to that illustrated in FIG. 3, while the curves for thicker glass, particularly of 0.500 inch (12.7 mm) and 0.750 inch (19.1 mm) thicknesses, tend to be more flat and horizontal. Thus, abrasive particles in the intermediate grit size range are well suited to cutting glass of varing commercially available thicknesses. As indicated above abrasive particles of differing grit sizes may be employed in practising the invention by varying other parameters such as the line speed. However, as a matter of convenience it is preferable that material of a single grit size be employed in cutting the various thicknesses, and a grit size in the above-noted range is well suited for this purpose. Abrasive material is readily available in a 150 grit size and thus such a material, for example, that is available under the name Barton garnet, may advantageously be employed in cutting glass in accordance with the invention.

Figure 4:
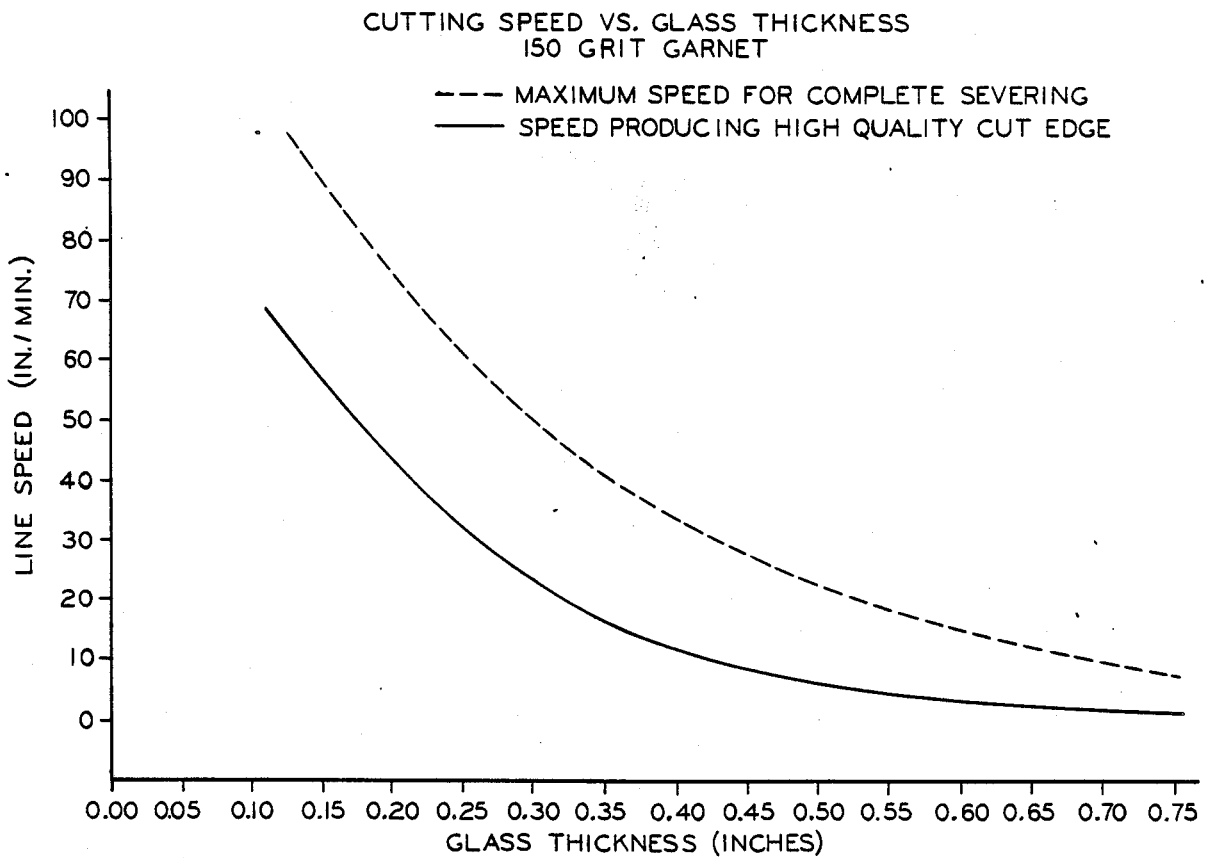
FIG. 4 is a graph illustrating the relationship between cutting or line speed and glass thickness for a particular grit size of the abrasive particles.

The graph of FIG. 4 plots the relationship between line speed in inches per minute and glass thickness in cutting the various thicknesses of glass in accordance with the invention, employing a 150 grit garnet as the abrasive medium in a fluid pressurized to about 30,000 psi. Again, the upper, broken line represents the maximum line speed at which the advancing abrasive jet will penetrate completely through the glass, while the solid line represents the line speed at which the cut glass edges will be of a smooth, uniformly high quality. In preparing the test data it was found that the maximum line speed for completely severing very thin glass, that is having a thickness less than about 0.150 inch (3.8 mm), exceeded the maximum line speed capability of the machine of FIGS. 1 and 2 employed for cutting the glass. In other words, glass of less than about 0.150 inch (3.8 mm) could be cut at speeds in excess of 100 inches per minute. The apparatus employed in cutting the glass in accordance with FIGS. 3 and 4, as best shown in FIG. 2, included a jewelled orifice 43 having a discharge opening 44 of 0.014 inch (0.35 mm) diameter, with a nozzle tube 47 having a length of 3 inches (7.62 cm) and a passageway 48 therethrough of 0.062 inch (1.57 mm) diameter. The end of the nozzle tube was located 0.050 inch (1.27 mm) from the surface of the glass. Deionized water was utilized as the jet fluid, and garnet abrasive particles were aspirated into the fluid stream at a feed rate of about one pound (0.454 kg) per minute.

In practicing the invention the fluid medium, generally deionized water, is pressurized in the high pressure intensifier for discharge through the nozzle assembly. Abrasive particles, for example 150 grit garnet, are aspirated into the jet stream at a rate of about one pound (0.454 kg) per minute. Where the advancing abrasive jet is to initially engage the glass at an exposed edge thereof, the fluid medium is pressurized in the high pressure intensifier to an ultra-high pressure on the order of 20,000 psi to 35,000 psi, and preferably about 30,000 psi, and the cutting apparatus 12 and nozzle assembly 14 are advanced so that the abrasive jet begins the cut at the edge and follows the path prescribed by the template 16. In those situations where the abrasive jet initially engages the glass at an interior location, the fluid medium is pressurized to a level on the order of 10,000 psi until the abrasive jet has made the initial cut through the glass, and the pressure in the high pressure intensifier is then significantly increased, for example to a level on the order of 20,000 psi to 35,000 psi and preferably about 30,000 psi. The cutting apparatus 12 and nozzle assembly 14 are then advanced along the path prescribed by the template 16 to cut the prescribed opening in the glass sheet S. After the initial penetration has been made, the glass does not shatter or vent when impacted by the abrasive jet stream pressurized to the aforementioned ultra-high pressure, apparently due to the progressive abrasive removal of glass fragments. Due to the speed at which the ultra-high pressure abrasive stream cuts through the glass, the line speed or movement of the nozzle assembly 14 relative to the glass can be signficantly increased while still producing cut edges of uniformly high quality.

As hereinabove described, abrasive particles of 150 grit size are particularly suitable for cutting the range of glass thicknesses most often employed in commercial practice at high line speeds in accordance with the invention. It will be understood, however, that cut edges of high quality can be achieved using abrasive particles of different grit size by suitably varying other parameters. Thus, it is noted that smaller abrasive particles, for example of 180 or 220 grit size, will produce very smooth cut edges but the line or cutting speed will be slower than with 150 grit material. Conversely, it is possible to cut through glass at faster overall line speeds with coarser 60 or 100 grit material but, due to edge chipping and hazing at the high speeds, the cut edge will be of reduced quality. In order to achieve edge quality equivalent to that produced with 150 grit material, it will be necessary to reduce the line speed. The angle of taper of the cut edges is dependent upon both grit size of the abrasive particles and line speed of the cutting device. Thus, the angle of taper of the cut edge increases as the abrasive particles are made finer and as the line speed increases.

It is to be understood that the forms of the invention herewith shown and described are to be taken as illustrative embodiments only of the same, and that various changes in the shape, size and arrangement of parts, as well as various procedural changes, may be resorted to without departing from the spirit of the invention.

We claim:

1. A method of maximizing the speed of cutting glass of various thicknesses along a desired path by means of an abrasive fluid jet so as to produce cut edges having at least a predetermined level of quality, said level of quality being a function of the rate of movement of the abrasive jet along said path, comprising discharging a highly collimated fluid jet from a pressurized source maintained at an ultra-high pressure level, entraining abrasive particles into the fluid jet, engaging said glass with said abrasive particle-containing fluid jet, moving said abrasive jet and glass relative to one another whereby said abrasive jet advances along said path and cuts through and severs said glass, observing the quality of the cut glass edge, and controlling the rate of movement of said abrasive jet relative to said glass in respone to said observed quality to maintain said rate of movement at the maximum at which said cut glass edge has at least said predetermined level of quality.

2. A method of cutting glass of various thicknesses along a desired path as claimed in claim 1, wherein said abrasive jet initially engages an edge of said glass to begin said cutting.

3. A method of cutting glass of various thicknesses along a desired path as claimed in claim 2, wherein said ultra-high pressure level is between about 20,000 psi and 35,000 psi.

4. A method of cutting glass of various thicknesses along a desired path as claimed in claim 3, wherein said ultra-high pressure level is about 30,000 psi.

5. A method of cutting glass of various thicknesses along a desired path as claimed in claim 4, wherein said abrasive particles have a grit size in the range from 60 to 220.

6. A method of cutting glass of various thicknesses along a desired path as claimed in claim 5, wherein said abrasive particles are garnet.

7. A method of cutting glass of various thicknesses along a desired path as claimed in claim 5, wherein said abrasive particles are zircon.

8. A method of cutting glass of various thicknesses along a desired path as claimed in claim 6 or 7, wherein said abrasive particles have a grit size of about 150.

9. A method of cutting glass of various thicknesses along a desired path as claimed in claim 8, wherein said rate of movement of said abrasive jet relative to said glass is not greater than the speed-versus-thickness relationship depicted by the broken line in the graph of FIG. 4.

10. A method of cutting glass of various thicknesses along a desired path as claimed in claim 8, wherein said rate of movement of said abrasive jet relative to said glass is about as indicated by the speed-versus-thickness relationship depicted by the solid line in the graph of FIG. 4.

11. A method of cutting glass of various thicknesses along a desired path as claimed in claim 1, wherein said pressurized source is initially maintained at a lower pressure level, said abrasive jet being directed against a major surface of said glass to initially penetrate said glass with said pressurized source at said lower level, and the pressure of said pressurized source is then increased to said ultra-high pressure level for advancement of said abrasive jet along said path.

12. A method of maximizing the speed of cutting glass of various thicknesses along a desired path by means of an abrasive fluid jet so as to produce cut edges having at least a predetermined level of quality, said level of quality being a function of the rate of movement of the abrasive jet along said path, comprising directing a highly collimated fluid jet against the surface of the glass from a pressurized source maintained at the first pressure level, aspirating abrasive particles into the fluid jet as it is directed toward the glass, initially penetrating the glass with the abrasive jet while said pressurized source is maintained at said first pressure level whereby said glass does not fracture, vent or chip in the area of initial severing, increasing the pressure in said pressurized source to a second level significantly greater than said first pressure level while continuing to direct said abrasive jet against said glass, advancing said abrasive jet along said path at said second pressure level whereby said abrasive jet cuts through and severs said glass along said path, observing the quality of the cut glass edge, and advancing said abrasive jet in response to said observed quality to maintain said rate of movement at the maximum at which said cut glass edge has at least said predetermined level of quality.

13. A method adapted for cutting glass of various thicknesses along a desired path as claimed in claim 12, wherein said first pressure level is not greater than about 10,000 psi.

14. A method adapted for cutting glass of various thicknesses along a desired path as claimed in claim 12, wherein said second pressure level is greater than 20,000 psi.

15. A method adapted for cutting glass of various thicknesses along a desired path as claimed in claim 12, wherein said second pressure level is about 30,000 psi.

16. A method adapted for cutting glass of various thicknesses along a desired path as claimed in claim 13 wherein said second pressure level is about 30,000 psi.

17. A method adapted for cutting glass of various thicknesses along a desired path as claimed in claim 12, wherein said abrasive particles have a grit size in the range from 60 to 220.

18. A method adapted for cutting glass of various thicknesses along a desired path as claimed in claim 17, wherein said abrasive particles are garnet.

19. A method adapted for cutting glass of various thicknesses along a desired path as claimed in claim 17, wherein said abrasive particles are zircon.

20. A method adapted for cutting glass of various thicknesses along a desired path as claimed in claim 18 or 19, wherein said abrasive particles have a grit size of about 150.

21. A method adapted for cutting glass of various thicknesses along a desired path as claimed in claim 20, wherein said rate of movement of said abrasive jet relative to said glass at said second pressure level is not greater than the speed-versus-thickness relationship depicted by the broken line in the graph of FIG. 4.

22. A method adapted for cutting glass of various thicknesses along a desired path as claimed in claim 20, wherein said rate of movement of said abrasive jet relative to said glass at said second pressure level is about as indicated by the speed-versus-thickness relationship depicted by the solid line in the graph of FIG. 4.

23. A method adapted for cutting glass of various thicknesses along a desired path as claimed in claim 22, wherein said first pressure level is not greater than about 10,000 psi and said second pressure level is about 30,000 psi.

* * * * *